US007603343B2

(12) United States Patent
von Ahn Arellano et al.

(10) Patent No.: US 7,603,343 B2
(45) Date of Patent: Oct. 13, 2009

(54) QUALITY OF WEB SEARCH RESULTS USING A GAME

(75) Inventors: Luis von Ahn Arellano, Pittsburgh, PA (US); Josh D. Benaloh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 11/050,980

(22) Filed: Feb. 4, 2005

(65) Prior Publication Data

US 2006/0179053 A1    Aug. 10, 2006

(51) Int. Cl.
  *G06F 17/30*    (2006.01)
(52) U.S. Cl. .................. 707/3; 707/1; 707/2; 707/6; 707/102; 705/10; 705/12; 705/14; 705/26; 705/52; 715/738
(58) Field of Classification Search .............. 707/2, 707/3, 6, 1, 102; 705/12, 14, 10, 26, 52; 715/738
See application file for complete search history.

(56) References Cited

U.S. PATENT DOCUMENTS

| 6,405,175 | B1* | 6/2002 | Ng ............................... 705/14 |
| 6,920,426 | B2* | 7/2005 | Takechi ......................... 705/1 |
| 7,246,106 | B2* | 7/2007 | Gaynor et al. ................. 707/1 |
| 7,403,910 | B1* | 7/2008 | Hastings et al. ............... 705/26 |
| 2001/0013009 | A1* | 8/2001 | Greening et al. .............. 705/10 |
| 2001/0047290 | A1* | 11/2001 | Petras et al. .................. 705/10 |
| 2002/0087400 | A1* | 7/2002 | Khoo et al. ................... 705/14 |
| 2002/0111863 | A1* | 8/2002 | Landesmann ................. 705/14 |
| 2004/0169678 | A1* | 9/2004 | Oliver ......................... 345/738 |
| 2005/0125307 | A1* | 6/2005 | Hunt et al. .................... 705/26 |
| 2008/0133417 | A1* | 6/2008 | Robinson ..................... 705/52 |

* cited by examiner

*Primary Examiner*—John E Breene
*Assistant Examiner*—Phong Nguyen
(74) *Attorney, Agent, or Firm*—Lee & Hayes, PLLC

(57) ABSTRACT

A system combines individual estimates of the subjective appeal of web pages into a combined rating for each web page that can be used to rank web pages during a web search. In a gaming implementation, a web page recipient estimates the combined rating that other recipients of the web page have formulated. The recipient can be rewarded for accurately estimating the combined rating by receiving a subsequent web page that possesses a high rating.

17 Claims, 4 Drawing Sheets

302

COMBINED RATING = 940

304

COMBINED RATING = 810

306

COMBINED RATING = 680

308

COMBINED RATING = 420

QUALITY OF WEB SEARCH RESULTS USING A GAME

TECHNICAL FIELD

The subject matter relates generally to web search technology and more specifically to improving quality of web search results using a game.

BACKGROUND

Web searching puts a great deal of information at the fingertips of anyone who can connect to the Internet with a computing device. A keyword search can instantly return thousands of web pages relevant to the search terms. Still, there is much room for improvement in how to perform good web searches and in how to best display the results, especially when the results are numerous.

When a web search results in a large number of "hits," then various techniques are needed to display the matches, since the practical display capability of a computer monitor is limited. The ability of a human to sift through thousands of hits is also limited. When there are numerous good matches, then the question becomes which web pages should be given priority in the listing of search results. Conventional web page rankers currently used to assign priority to search results use a common metric of how many other web pages link to the page being ranked. The number of linked web pages is readily available and built into the fabric of the Internet. Whereas this metric may give some indication of a web page's value, it is only a rough guide because the reason for many links from other web pages may be irrelevant to the search at hand. Additionally, it is possible to exploit the property of being a well-linked web page. To increase the likelihood of a web page appearing in a search, a web site owner can create many dummy sites to link the page to be boosted in search results.

More apt criteria for ranking search results in a satisfying manner are needed. That is, more ways are needed to anticipate what a human searcher would enjoy seeing first in a listing of search results.

SUMMARY

A system combines individual estimates of the subjective appeal of web pages into a combined rating for each web page that can be used to rank web pages during a web search. In a gaming implementation, a web page recipient participating in a rating game estimates the combined rating that other recipients of the web page have formulated. The player can be rewarded for accurately estimating the combined rating by receiving a subsequent web page that possesses a high rating and thus probably a high appeal. In various implementations, the rewarding can also consist of allotting a player points in inverse relation to the difference between the combined rating for the web page and the recipient's estimate of the combined rating; or, allotting a jackpot if the recipient's estimate matches the combined rating for the web page exactly.

In one implementation, web page recipients are ranked according to the recipients' history of accurately estimating the ratings of web pages. A weighting factor can then be assigned to each recipient so that recipients with a history of accuracy have a greater effect on the ratings of web pages to be used to prioritize web search results.

DETAILED DESCRIPTION

Overview

Figure 1:
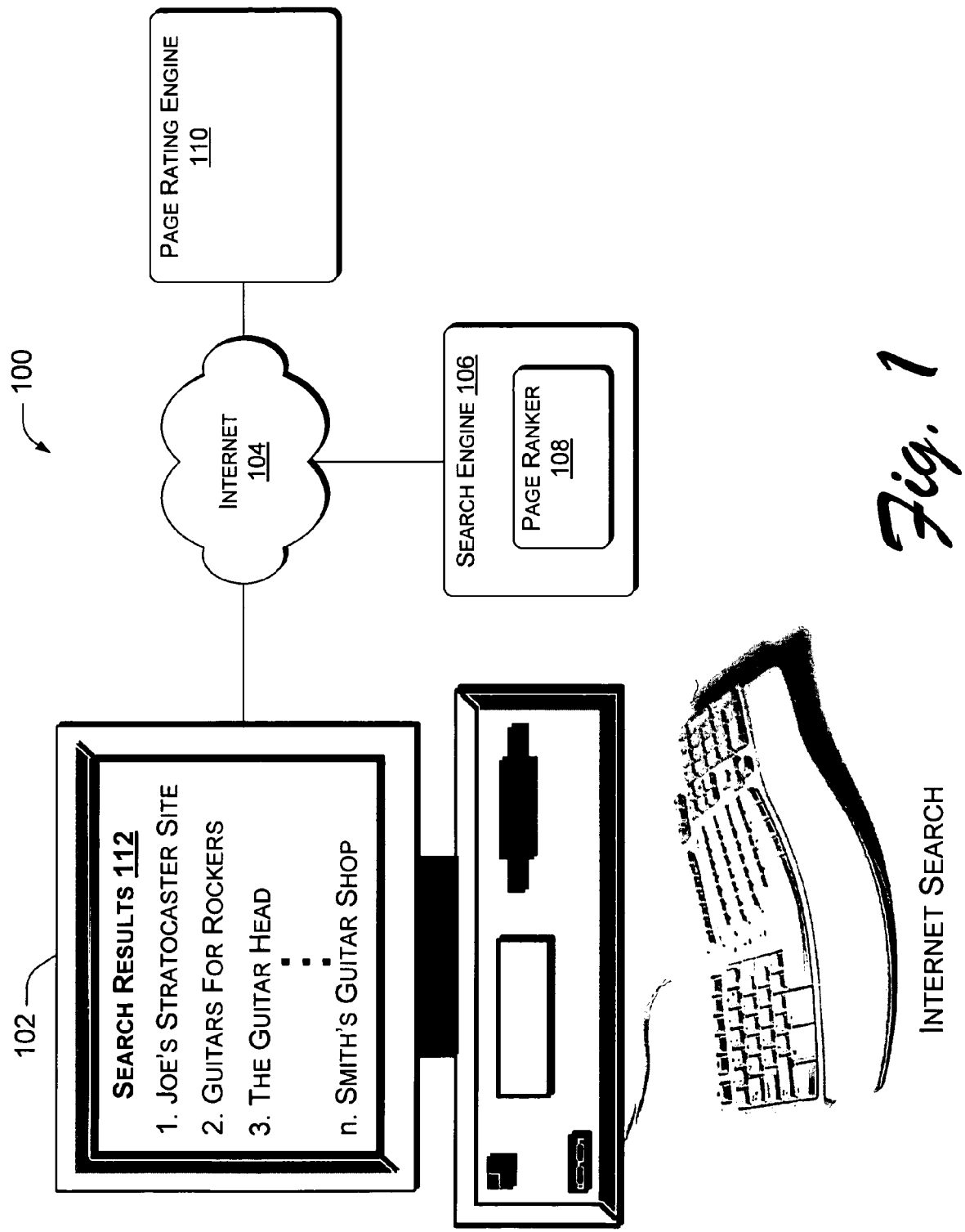
FIG. 1 is a graphic representation of an exemplary system for improving the quality of web search results.

Systems, engines, and methods are described herein for improving the quality of web search results. Web searches are not just exchanges of information between machines, but involve various degrees of catering to human behavioral characteristics, psychology, moods, etc. For example, it is easy to imagine how search results might be arranged to best suit the needs of a machine—perhaps in a flat file format—and how the same results might be made more appetizing, colorful, and rewarding to humans, even tailored to various human age groups.

The subject matter described herein inserts a human evaluation cycle into the ranking of web pages to be displayed from a web search. A web search typically begins with a distillation of a human inquiry into a few concise search terms. The web search "decompresses" the concise search terms into numerous matches. The subject matter described herein ranks the matches for display using certain elements of human intuition and taste backed up by a solid statistical principle. In one implementation, the subject matter collects individual ratings of each web page's subjective appeal. That is, before searching is performed the web pages are rated. The individual ratings are given a measure of increased validity by having participants estimate what the combined rating of all other participants is, rather than providing their own individual rating. Using a group consensus of a web page's subjective appeal provides a more statistically objective ranking quantity for prioritizing web search results, even though the characteristic being rated is a subjective one with respect to individuals. In other words, what might be viewed as a certain capriciousness in having a human evaluation cycle included in the logic to be used by a page ranker is overcome somewhat by a statistical treatment of a potentially large number of estimates. The statistics kept by insurance companies can sometimes very accurately predict the future, for instance. In a like manner, if an individual person likes or dislikes a web page, that is a very subjective matter. But if several thousand people indicate that web page "A" is better that web page "B," then there is some useful statistical veracity inherent in the large-scale preference that can be used to rank web pages to be displayed in a listing of web search results. This additional criterion for ranking web pages—people's subjective preference—can be all the more important when by all other measures of logic two or more web pages appear identical in the perception of a machine or a non-human algorithm.

In one implementation of the subject matter, a game gathers human input that is used to create pre-established ranks for web pages. In one exemplary game, a player is shown the image of a web page or a "front page" of a web site. Instead of rating the image according to the player's own preferences, the player rates the web site according to an estimate of how the player believes other people rate the web site. Thus, the player predicts or anticipates other people's ratings, reactions, and impressions. A player's estimate of other people's ratings may be a more accurate measure since incentive is given for honest responses.

Exemplary Page Rating System

FIG. 1 shows an exemplary page rating system 100, in which a client computing device 102 coupled to the Internet 104 consults a web-based search engine 106 that includes access to a page ranker 108. In this example, the human person performing the search is looking for information on "electric guitars." The search returns four web pages that match the search criteria (of course, more web pages would be returned in real-life web search). To a conventional search engine, the four matches appear significantly or exactly equivalent because by a conventional metric, each of the four matching web sites is referred to by five hundred other web pages. However, in the illustrated system 100, an exemplary page rating engine 110 is communicatively coupled to the search engine 106 via the Internet 104. The page rating engine 110 has distinct subjective ratings for each of the electric guitar web pages, and gives the page ranker 108 of the search engine 106 information to produce ranked search results 112 that are more likely to be rewarding to the human searcher.

Exemplary Page Rating Engine

Figure 2:
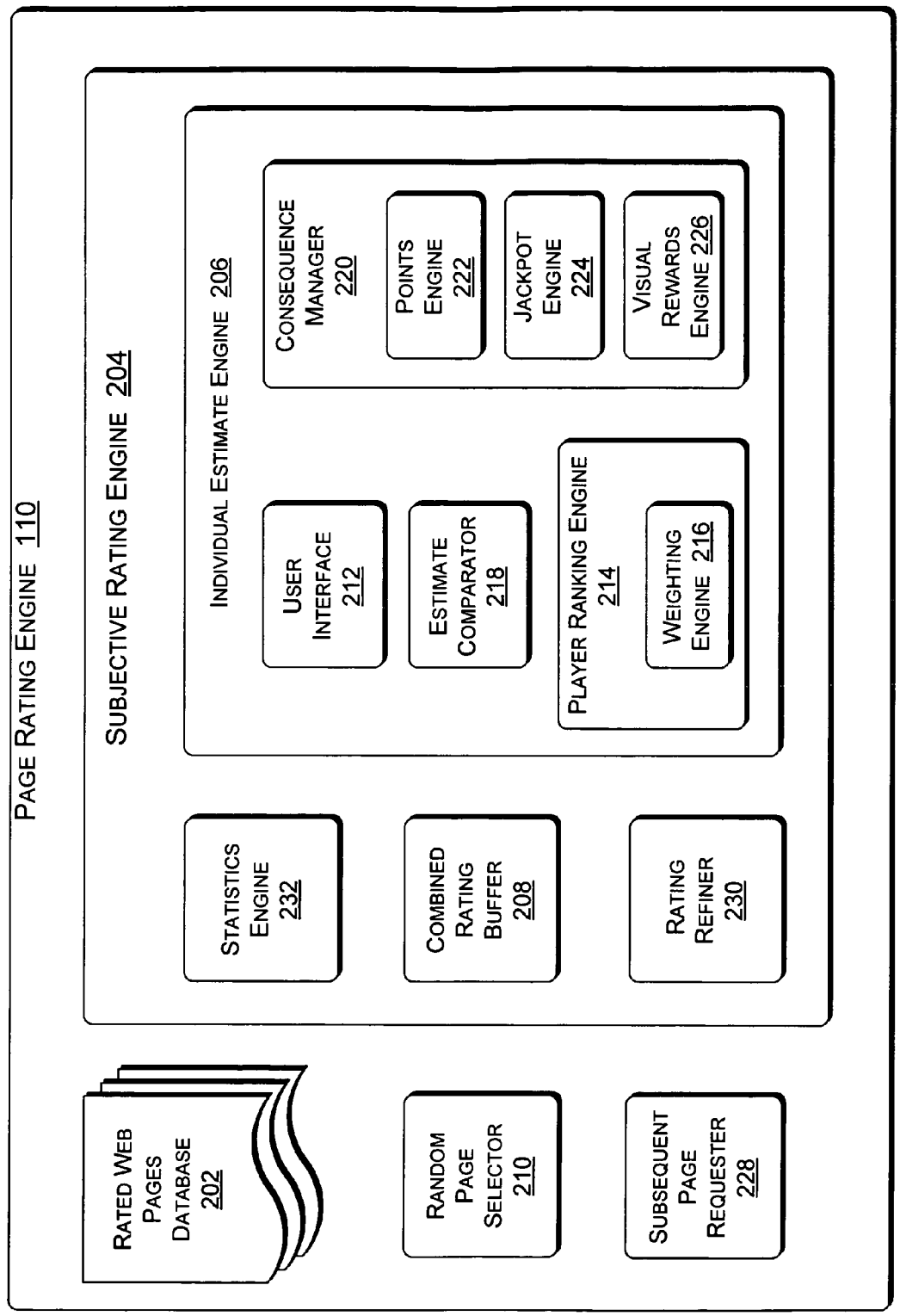
FIG. 2 is a block diagram of an exemplary page rating engine.

FIG. 2 shows the exemplary page rating engine 110 of FIG. 1 in greater detail. It should be noted that the illustrated page rating engine 110 is only one example configuration that could be implemented in software, hardware, or combinations of hardware, software, firmware, etc. Other configurations of a page rating engine according to the described subject matter are also possible using the same or other components. It should also be noted that although FIG. 2 shows a search engine 106 and the exemplary page rating engine 110 as separate entities, in an alternative implementation, the page rating engine 110 can be included as part of a search engine 106. That is, in some implementations, the page rating engine 110 can share or be integrated into the fabric of a search engine system. It is also worth noting that although a page rating engine 110 can expose a game, it is not in itself a game, in fact there may be alternate ways other than a game that a page rating engine 110 could gather web page ratings from individuals.

In one implementation, a page rating engine 110 includes a catalogue or database of rated web pages 202. The rated web pages database 202 can include web page identifiers (e.g., hyperlinks) and associated ratings. In another implementation, the web pages database 202 may include images or screen shots of the web pages to be rated. A search engine 106 or other external process can consult the rated web pages database 202 to use the ratings for ranking search results. The ratings of the rated web pages database 202 can be used to augment other ranking techniques or can be used as the only criterion for ranking search results.

In one implementation of a game for soliciting ratings for web pages, a subjective rating engine 204 gathers ratings from individual players via an individual estimate engine 206. Each web page evaluated in the game uses an individual player's rating to refine an ongoing aggregate rating averaged from many other players who have rated the web page. The aggregate rating that is combined or averaged, for example, over two-thousand players, is referred to herein as the "combined rating" that can be stored with a web page's identifier in the web pages database 202 and can also be stored in a combined rating buffer 208 for use (and for being updated) in the subjective rating engine 204. Of course, as more players rate a web page, the more likely the rating represents a de facto group consensus. It should be noted, however, that a combined rating is not more "correct" than an individual rating—there is no correct answer. The combined rating is simply the combined rating of a group of players, but useful for ranking web search results according to a human preference. In other words, the group consensus that makes up a web page rating is humanly useful but cannot be tested against some other objective to see if the consensus is correct.

When a player first begins playing and there are already web pages in the "rated pages database" 202 that each have a combined rating, a random page selector 210 exposes one of the web pages in the database 202 to a player through a user interface 212. The player makes an estimate of (e.g., guesses) the pre-existing combined rating of the web page. In other words, the player gauges the impression that (the player believes) the web page has made on others or will make on others in the future. This guessing of what others have rated instead of the player rating the web site according to personal taste has some advantages. First, it places the individual player's estimate in an objective realm of comparison with the pre-existing combined rating. Then, there is little that is subjective about comparison of the two quantities: the combined rating is an objective number on a rating scale, and the individual player's estimate of the combined rating is another objective number on the same scale. Accordingly, it is just a matter of subtracting the difference between the two numbers to obtain an objective difference quantity.

A second advantage of having a player guess a group consensus is that it keeps the focus on the group rating, which is the property being cultivated for improving web searches. That is, the desirable characteristic for purposes of ranking search results is that a vast number of people think the web page rates at a certain level, so it is likely that when the web page turns up in the search results of a single individual, the group ranking will also represent the individual's taste with high probability.

Thirdly, estimating what others have collectively rated a web page may keep a bona fide player from lying or kidding about a rating. In other words, on an individual scale there is no way to test whether an individual player's direct rating (the player rating their own reaction) should be taken seriously for purposes of refining the aggregate combined rating. There is simply nothing that can be used to determine whether an individual's estimate is bona fide in itself—it cannot be ascertained if a given estimate is a bona fide opinion versus a lie or an accident. But the exemplary technique of having players guess a group consensus may filter out lying, second-guessing, etc. If the player's individual guess is close to the group consensus the player is rewarded and gains credibility, points, or other rewards, but if the player's guess is far from the group consensus, the player is not rewarded or is demerited, and the player may lose credibility or points.

Fourthly, having individual players guess a group consensus allows a player ranking engine 214 to identify players who are skilled at guessing a group consensus. A weighting engine 216 can give the estimates of these identified players extra weight toward refining the combined rating. (Likewise, just as the estimates of a player with a poor track record may be given little weight.) The estimates of players who have developed a good reputation for guessing the group consensus may also be used to give an initial rating to a new web page in lieu of exposing the web page to numerous users.

When a player views a web page through the user interface 212 and makes an estimate of the combined rating, an estimate comparator 218 finds the difference between the individual guess and the combined rating. The rating scale can be 1-10, 1-100, 1-1000, etc., depending on how the rating is to be used, not only for ranking the web page in a search, but also for rewarding or docking the player. A consequence manager 220 may be included to handle feedback to the player after an estimate is made. In one implementation, a points engine 222 allots points in relation to the nearness of an individual guess to the combined rating. For example, on a scale of 1-1000, a guess within 50 rating points of the current combined rating may obtain a reward of 10 score points. A guess within 10 points of the current combined rating may obtain a reward of 25 score points. Likewise, a guess within 5 points of the current combined rating may obtain a reward of 100 score points.

Using an example rating scale of 1-1000, a jackpot engine 224 may be included to allot a large number or points, say 1000 points, or other prizes for an exact guess. The jackpot engine 224 and the consequence manager 220 may send information about the player's guessing skills to the player ranking engine 214.

A visual rewards engine 226 may also be included to reward accurate or close guesses with subsequent web pages for evaluation that are thought to be more appealing than those the player has just rated. Of course the same strategy can be used in reverse for players who guess poorly.

Figure 3:
FIG. 3 is a graphic representation of example web pages with exemplary combined ratings.
Figure 3:
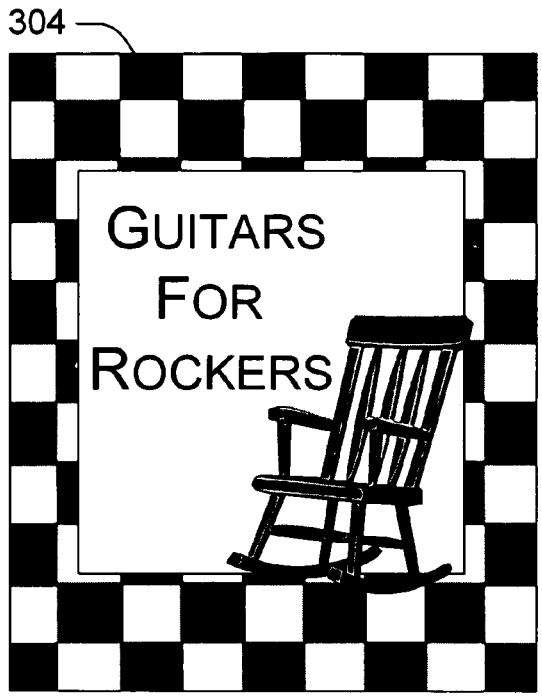
Figure 3:
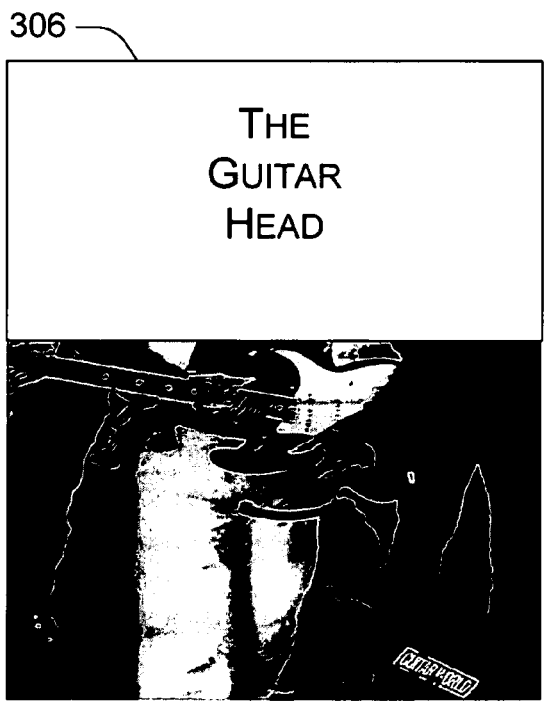
Figure 3:
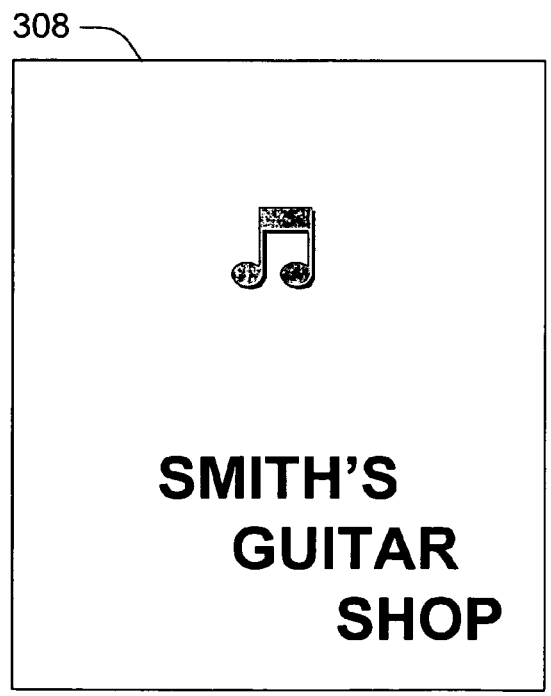

Referring to FIG. 3, the combined ratings of the four web pages listed in FIG. 1 are shown with an image of each web page. In order of descending combined rating, a first web page 302 has a rating of 940; a second web page 304 has a rating of 810; a third web page 306 has a rating of 680; and a fourth web page 308 has a rating of 420. If a player is shown the second web page 304 and guesses the group consensus perfectly—the combined rating of 810—then the player may earn a reward to see a web page with a higher ranking, for example, the first web page 302 with a rating of 940. Likewise, if the player is far off the mark in guessing the group consensus for the second web page 304 and misses by 300 points, then the player may be docked points by the points engine 222 and/or demerited with a subsequent web page (e.g., 306 or 308) that has a lower rating.

To avoid telegraphing to the player the likely ratings of upcoming web pages, however, the web pages given out as rewards (or demerits) may be mixed in at random over a selected series of upcoming web pages. Otherwise, if consequences were immediately meted out, then a player with a successful guess would know to guess higher on the next turn. To avoid this kind of compromising feedback to the player, earning a consequence and its execution are usually isolated from each other, e.g., by being mixed in with turns that offer evaluation of random web pages.

Referring back to FIG. 2, a subsequent page requester 228 decides when to ask for random web pages and when to ask for consequential web pages to be presented as rewards or demerits. For consequential web pages being used as a reward or demerit, the subsequent page requester 228 may suggest a certain rating range for the next web page to be shown to the player.

A rating refiner 230 applies an individual player's estimate to an adjustment of the combined rating for the current web page. Updating the combined rating may take different forms. In one implementation, the combined rating is simply re-averaged to include the new rating divided by the new total number of people who have rated the web page. In another or the same implementation, the rating refiner 230 may include filters to discard guesses from players that should not be applied to the combined rating. For example, suppose that a player always selects the same rating, no matter what. This may happen when a player is just trying to thumb through the offered web sites, without really performing a rating function. This kind of non-responsive input can be discarded.

As previously mentioned, the rating refiner 230 may nuance its refinement to be applied to the combined rating based on the player's credibility as determined by the player ranking engine 214. A statistics engine 232 may be included to assist in ranking players and to determine weights to be used by the weighting engine 216 for refining the combined rating based on a player's credibility or track record. The statistics engine 232 may also decide when enough players have made estimates that their collective estimates can be referred to as a "combined rating." For example, it may not make sense to call a web page's rating a group consensus if only three players have rated the web page. However, if one of the three players has an extraordinary track record in guessing correctly (as indicated, e.g., by high scoring points) then it may make sense to refer to a sparse number of estimates as a combined rating, i.e., as reflecting a likely group consensus for the web page.

Exemplary Method

Figure 4:
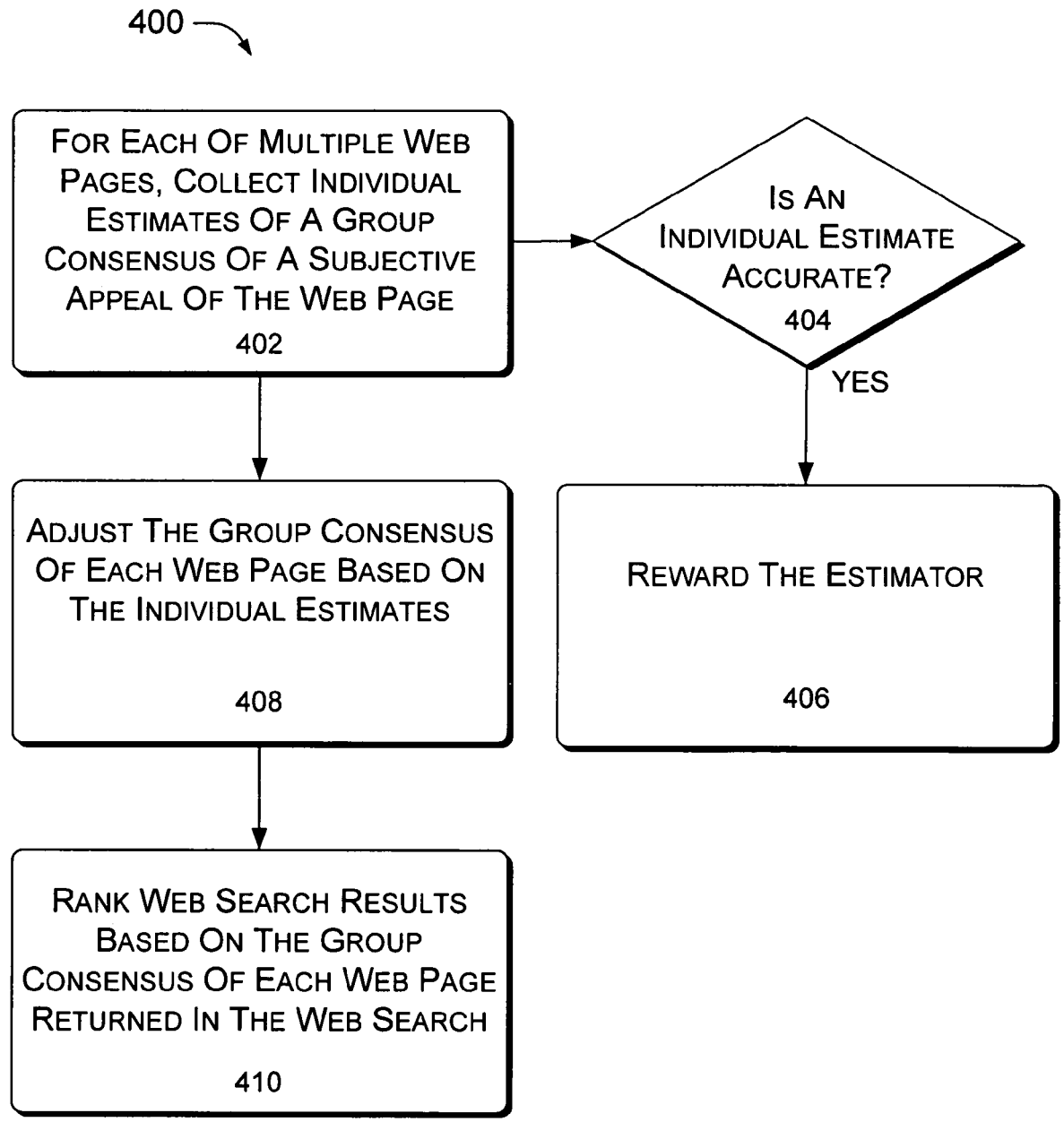
FIG. 4 is a flow diagram of an exemplary method of improving the quality of web search results.

FIG. 4 depicts an exemplary method 400 of improving the quality of web search results. The exemplary method 400 is only one method that can be derived from the subject matter and is not meant to be summary. In the flow diagram, the operations are summarized in individual blocks. It should be noted that the exemplary method 400 may be performed by hardware, software, or combinations of both, for example, by components of an exemplary page rating engine 110.

At block 402, individual estimates of a web page's subjective appeal are collected. Each individual estimate may rate or guess at a global rating that collectively combines estimates of the web page's subjective appeal, i.e., a group consensus. The group consensus rating can be an average of the estimates of all participants rating the web page, or can be weighted to favor those participants who have a history of guessing the group consensus accurately. Since the combined ratings for web sites are used to rank web search results, game participants who are skilled at guessing the group consensus are useful for assigning a rank to a new web page without going through the work of colleting numerous ratings or estimates. A rating assigned by a skilled participant is likely to be very close to the statistical average of numerous estimates gathered from many participants. The combined rating for a web page is useful for ranking web search results because the subjective appeal that is rated by the exemplary method 400 is the same subjective appeal by which web search results can be ranked to best reward the spirit of inquiry of a human web searcher.

At block 404, in some implementations, the exemplary method 400 decides whether an individual estimate is accurate. If so, the exemplary method 400 proceeds to block 406 to reward the participant providing the accurate estimation. In a gaming implementation, the reward can take various forms, such as points, prizes, jackpots, and provision of more subjectively appealing web pages to be sent to the successful participant in subsequent turns.

At block 408, the group consensus is groomed with the individual estimates. Guessing the group consensus rating instead of an individual's own rating provides a measure of honesty for individual participants since their estimations are compared with the averaged rating of a potentially large group. In other words, in a gaming context, the players are playing against an objective average. In some implementations, as mentioned, the guesses of better players are weighted to effect the group consensus rating more, or even used to develop an initial rating for a new web page to be evaluated by the exemplary method 400.

At block 410, web search results consisting of at least some of the web pages subjected to the exemplary method 400 are ranked according to their combined ratings—i.e., according to their level of subjective appeal as held by group consensus.

The combined ratings of numerous web pages can be provided to other search engines and searching processes that use the Internet or other network.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems, engines, and methods for improving the quality of web search results. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method having computer instructions that are executable on a computing device, the method comprising:
   collecting a rating for each of multiple web pages from a group of recipients of web pages;
   presenting a rating game to a recipient where the recipient receives a random web page from the multiple web pages to rate;
   rewarding or demeriting the recipient based on a rating submitted by the recipient, wherein the random web page has a combined rating of the group of recipients when the recipient receives the random web page;
   collecting a rating estimate from the recipient on how the group of recipients rate the random web page of the multiple web pages, the rating estimate comprising an estimate of the combined rating of the group of recipients, wherein the estimate of the combined rating comprises an estimate of a subjective impression the web page makes on the other recipients;
   assigning a weighting factor to the recipient, wherein a recipient with a history of accurately estimating the ratings of how the group of recipients rate each of the multiple web pages has a greater effect on the ratings of the web pages used in prioritizing web search results;
   ranking at least some of the results of a web search that returns at least some of the multiple web pages according to the ratings, wherein the ranking results of the web search is based on the combined, weighted ratings of the multiple web pages from the group of recipients and the recipient;
   updating the combined, weighted ratings of the multiple web pages by including a new rating divided by a new total number of recipients who have rated the web page or including filters to discard guesses from recipients that tend to select a same rating, without performing a function on the web page; and
   presenting a next web page which includes another random web page or a consequential web page to the recipient for rating, the consequential web page corresponds to the recipient being rewarded or demerited based on the rating submitted by the recipient, and the another random web page is presented to prevent a compromising feedback to the recipient that affects the rating estimate following a rewarded or a demerited rating by the recipient.

2. The method as recited in claim 1, further comprising:
   collecting ratings for each of the multiple web pages from multiple web page recipients;
   for each web page, combining the ratings from the multiple web page recipients into the combined rating for the web page; and
   ranking results of a web search according to the combined ratings of the multiple web pages.

3. The method as recited in claim 2, wherein combining the ratings comprises averaging the ratings from the multiple recipients into the combined rating for the web page.

4. The method as recited in claim 2, further comprising rewarding a recipient in response to accurately estimating a combined rating of all the recipients.

5. The method as recited in claim 4, wherein the rewarding comprises sending the recipient a web page that has a high combined rating.

6. The method as recited in claim 4, wherein the rewarding comprises allotting the recipient points in inverse relation to the difference between the combined rating for the web page and the recipient's estimate of the combined rating.

7. The method as recited in claim 4, wherein the rewarding comprises allotting the recipient a jackpot if the recipient's estimate of the combined rating for the web page matches the combined rating for the web page exactly.

8. The method as recited in claim 2, further comprising updating the combined rating for a web page with the recipient's estimate of the combined rating.

9. The method as recited in claim 2, further comprising:
   ranking the multiple recipients according to an accuracy of each recipient's estimates of the combined ratings for the multiple web pages;
   assigning a weight to each recipient according to each recipient's rank; and
   updating the combined rating for a web page with each recipient's weighted estimate of the combined rating.

10. The method as recited in claim 2, further comprising sharing the combined ratings of the multiple web pages with one of a web searching process or a web search engine.

11. A storage medium comprising a plurality of executable instructions which, when executed, implement a method according to claim 2.

12. A page rating engine, comprising:
    a processor;
    a memory coupled to the processor;
    a user interface for presenting web pages to each of multiple recipients and collecting a rating of each web page from each of the multiple recipients, wherein the rating of each recipient comprises an estimate of a combined rating of the recipients, wherein the estimate of a combined rating comprises an estimate of a subjective impression the web page makes on the other recipients;
    a weighting engine for assigning a weighing factor to the individual recipient, wherein an individual recipient with a history of accurately estimating the ratings of how the multiple recipients rate each web page has a greater effect on the ratings of web pages used in prioritizing web search results;

an estimate comparator for finding a difference between a rating of the individual recipient and a combined rating of all the multiple recipients of a web page;

a subsequent page requester for deciding a next web page to be presented which includes when to request a random web page to be presented and when to request a consequential web page to be presented to the recipient for rating, wherein the consequential web page corresponds to the individual recipient being rewarded or demerited based on the rating collected from the individual recipient, and the random web page is presented to prevent a compromising feedback to the individual recipient that affects the rating estimate following a rewarded or a demerited rating by the individual recipient;

a rating refiner for adjusting the combined rating based on the rating of the individual recipient, wherein the rating refiner updates the combined rating of the web pages by including a new rating divided by a new total number of recipients who have rated the web page or including filters to discard guesses from recipients that tend to select a same rating, without performing a function on the web page; and a rated web pages database, wherein in response to a web search, at least some of the web pages in the web pages database are prioritized for display according to their combined ratings;

wherein ranking results of the web search is based on the combined, weighted ratings of the web pages from the multiple recipients and the individual recipient.

13. The page rating engine as recited in claim 12, further comprising a consequence engine to reward each recipient based on the difference between the rating of the individual recipient and the combined rating of all the recipients of the web page.

14. The page rating engine as recited in claim 13, further comprising a visual rewards engine to send a web page associated with a high combined rating to a recipient in response to the recipient accurately estimating the combined rating of a web page.

15. The page rating engine as recited in claim 12, further comprising a ranking engine for weighting a recipient's effect on the combined rating of the web page according to the recipient's history of accurately estimating the combined ratings of web pages.

16. A system, comprising:
a processor;
a memory coupled to the processor;

means for presenting a rating game to an individual from a group of recipients where the individual receives a random web page to rate;

means for rewarding or demeriting the individual based on a rating collected from the individual, wherein the random web page has a rating when the individual receives the random web page;

means for collecting the rating for each web page from the group of recipients of web pages, wherein the rating of each recipient comprises an estimate of a combined rating of the recipients, wherein the estimate of a combined rating comprises an estimate of a subjective impression the web page makes on the other recipients;

means for assigning a weighting factor to the individual, wherein an individual with a history of accurately estimating the ratings of how the group of recipients rate the web pages has a greater effect on the ratings of web pages used in prioritizing web search results;

means for adjusting the group of recipients rating based on each of the rating estimates from the individual, wherein the adjusting of the rating estimates of the web pages includes: a new rating divided by a new total number of recipients who have rated the web page or filters to discard guesses from recipients that tend to select a same rating, without performing a function on the web page;

means for prioritizing display of web search results based on the group of recipients rating of each web page returned in the web search;

means for presenting a next web page which includes another random web page or a consequential web page to the recipient for rating, the consequential web page corresponds to the recipient being rewarded or demerited based on the rating submitted by the recipient, and the another random web page is presented to prevent a compromising feedback to the recipient that affects the rating estimate following a rewarded or a demerited rating by the recipient; and means for ranking at least some of the results of a web search that returns at least some of the multiple web pages according to the ratings, wherein ranking results of the web search is based on the combined, weighted ratings of the web pages from the group of recipients and the individual.

17. The system as recited in claim 16, further comprising means for rewarding an accurate individual estimate of the group consensus.

* * * * *